United States Patent [19]

Akutagawa et al.

[11] Patent Number: 5,276,073

[45] Date of Patent: Jan. 4, 1994

[54] THERMOSETTING RESIN COMPOSITION COMPRISING MALEIMIDE, ANHYDRIDE, EPOXY RESIN AND WOLLASTONITE

[75] Inventors: Ichiro Akutagawa, Nagareyama; Kunimitsu Matsuzaki, Yono; Toshio Matsuo, Koshigaya; Ryuichi Fujii, Urawa; Satoru Umeki, Hitachi; Yoshimichi Ono; Takeo Miyamoto, both of Ibaraki; Koki Ueta, Katsuta; Naoki Kamada, Mito, all of Japan

[73] Assignees: Somar Corporation; Hitachi, Ltd., both of Japan

[21] Appl. No.: 925,327

[22] Filed: Aug. 6, 1992

Related U.S. Application Data

[63] Continuation of Ser. No. 429,277, Oct. 30, 1989, abandoned.

[30] Foreign Application Priority Data

Aug. 26, 1989 [JP] Japan .................................. 1-219751

[51] Int. Cl.⁵ ...................... C08L 63/00; C08L 63/04; C08G 59/40
[52] U.S. Cl. ................................... 523/440; 523/443; 523/466; 528/94; 528/113; 528/117
[58] Field of Search ....................... 523/466, 440, 443; 528/94, 117, 113

[56] References Cited

U.S. PATENT DOCUMENTS

| | | | |
|---|---|---|---|
| 3,725,345 | 4/1973 | Bargain | 528/113 |
| 4,401,776 | 8/1983 | Munk | 523/443 |
| 4,490,492 | 12/1984 | Skudelny et al. | 523/443 |
| 4,510,272 | 4/1985 | Loszewski | 528/94 |
| 4,579,916 | 4/1986 | Schmid et al. | 528/94 |

OTHER PUBLICATIONS

*Chemical Abstracts*, vol. 107, No. 16, Oct. 16, 1987, p. 53, Col. 1, #135 431q.

*Chemical Abstracts*, vol. 98, No. 20, May 19, 1983, p. 37. Col. 1, #161 708a.

*Primary Examiner*—Frederick Krass
*Attorney, Agent, or Firm*—Lorusso & Loud

[57] ABSTRACT

A thermosetting resin composition useful for slot insulation purposes is disclosed, which includes:
a liquid epoxy resin;
a curing agent including an acid anhydride;
a maleimide resin in an amount of 3–50 parts by weight per 100 parts by weight of the liquid epoxy resin; and
finely divided wollastonite in an amount of 50–400 parts by weight per 100 parts by weight of the liquid epoxy resin.

10 Claims, 4 Drawing Sheets

THERMOSETTING RESIN COMPOSITION COMPRISING MALEIMIDE, ANHYDRIDE, EPOXY RESIN AND WOLLASTONITE

This application is a continuation of application No. 07/429,277, filed Oct. 30, 1989, now abandoned.

BACKGROUND OF THE INVENTION

This invention relates generally to a thermosetting resin composition and, more particularly, to an epoxy resin composition useful for insulation of stator or rotor coils.

In the field of automobiles, there are increasing demands for compact motors such as for use in starters in correspondence to the recent demands for minimizing the space of engine rooms. Since the revolution speed of such a smallsized motor must be increased to, for example, as high as several r.p.m. in order to obtain a desired output torque, the current density of the coil is increased so that the temperature of the rotor becomes as high as about 350° C. during use. As a result, when a conventional vanish is used for fixing and insulating the coils, cracks or blisters are formed in the vanish coat during operation of the motor, so that there are caused insulation failure and loosening of the windings.

An epoxy resin composition has also been used for fixing stator coils or armature coils. One such known epoxy resin composition is composed of 3,4-epoxycyclohexyl-methyl-(3,4-epoxy)cycloheanecarboxylate, methylnadic anhydride and resorcinol (Japanese Unexamined Patent Application No. 57-174314). In use, this composition is mixed with a small amount of triethanolamine and the mixture is applied to a coil to be fixed. The curing is performed at 120° C. for 16 hours and then at 180° C. for 16 hours. Thus, this epoxy composition has a drawback because it requires a long curing time. Another problem of the known epoxy resin composition is that the cured resin is poor in heat-resistance and cannot be used under conditions involving a high temperature of 200° C. or more.

SUMMARY OF THE INVENTION

It is, therefore, an object of the present invention to provide a novel epoxy resin composition which is devoid of the drawbacks of the conventional epoxy resin composition.

It is a special object of the present invention to provide an epoxy resin composition which has good penetrability into interstices of coil windings, which can fix the coil tightly, which is also suited for slot insulation and which can give a cured body excellent in both heat-resistance and mechanical strength.

It is a further object of the present invention to provide an epoxy resin composition of the above-mentioned type which can be cured with a relatively short period of time.

It is yet a further object of the present invention to provide an epoxy resin composition which has a long pot life or shelf life.

In accomplishing the foregoing objects, there is provided in accordance with the present invention a thermosetting resin composition, comprising:

a liquid epoxy resin;

a curing agent including an acid anhydride;

a maleimide resin in an amount of 3-50 parts by weight per 100 parts by weight of said liquid epoxy resin; and finely divided wollastonite in an amount of 50-400 parts by weight per 100 parts by weight of said liquid epoxy resin.

In another aspect, the present invention provides a method of insulating windings provided around slots of a rotor, comprising the steps of:

providing the above-mentioned thermosetting resin composition;

applying said composition to said slots and/or said windings; and curing said applied composition.

BRIEF DESCRIPTION OF THE DRAWINGS

Other objects, features and advantages of the present invention will become apparent from the detailed description of the invention which follows, when considered in light of the accompanying drawings, in which.

DETAILED DESCRIPTION OF THE INVENTION

Figure 1:
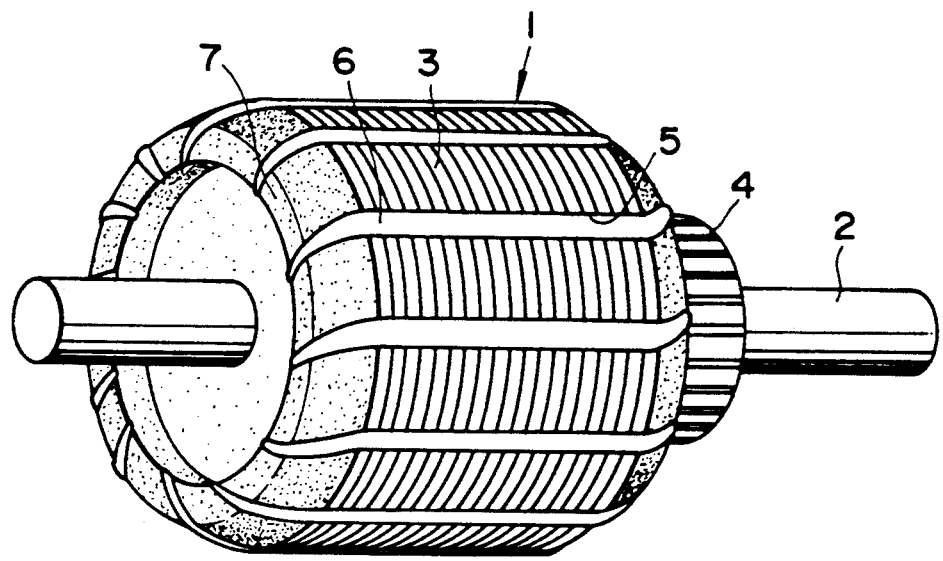
FIG. 1 is a perspective view diagrammatically illustrating a rotor of a motor.

A variety of epoxy resins may be used in the thermosetting resin composition of the present invention as long as they are liquid at room temperature and have two or more epoxy groups in the resin molecule. Illustrative of suitable epoxy resins are glycidyl ether-type epoxy resins such as glycidyl ethers of bisphenol A, brominated bisphenol A, bisphenol F, phenol novolak, glycerin or polyalkylene oxides; glycidyl ester-type epoxy resins such as glycidyl esters of dimer acid or isophthalic acid; alicyclic epoxy resins such as vinylcyclohexene dioxide; and epoxidized polybutadiene obtained by reaction of polybutadiene with peracetic acid.

The above epoxy resins may be used by themselves or in the form of a mixture of two or more thereof. Further, these epoxy resins may be used in conjenction with an epoxy compound serving as a diluent for lowering the viscosity of the thermosetting resin composition. Examples of such diluents include 1,6-hexanediol diglycidyl ether, polyalkyleneglycol diglycidyl ether, trimethylolpropane triglycidyl ether, butyl glycidyl ether and phenyl glycidyl ether. Further, a crystalline or solid epoxy resin may be added to the composition as long as it can be dissolved in the liquid epoxy resin. Examples of such solid epoxy resins include glycidyl ethers of resorcin or hydroquinone.

As a curing agent for the above epoxy resins, the present invention employs an acid anhydride, preferably a liquid acid anhydride. The liquid acid anhydride may be, for example, methyltetrahydrophthalic anhydride, methylhexahydrophthalic anhydride, methylnadic anhydride and methylbutenyltetrahydrophthalic anhydride. These acid anhydrides may be used singly or in combination of two or more thereof. If desired, a crystalline or solid acid anhydride may be added to the composition as long as it can be dissolved in the compsition. Examples of such solid acid anhydrides are benzophenonetetracarboxylic dianhydride, methylcyclohexenedicarboxylic anhydride and a reaction product of dicyclopentadiene with maleic anhydride. The acid anhydride curing agent is generally used in an amount of 0.5-1.5 mole, preferably 0.7-1.3 mole per one equivalent of the epoxy group of the epoxy resin.

The curing agent is preferably used in conjunction with a curing accelerator such as a tertiary amine, a salt of a tertiary amine, a quaternary ammonium salt, a metal salt, an imidazole compound, a BF$_3$-amine complex and 1,8-diazabicyclo(5,4,0) undecene-7 or an adduct thereof. Illustrative of suitable curing accelerators are benzyldimethylamine, tris(2,4,6-dimethylaminomethyl)phenol or a 2-ethylhexylic acid salt thereof, 1-benzyl-2-methylimidazole, trimethylammonium chloride and BF$_3$-monoethylamine.

The maleimide resin to be used in the present invention is a resin having at least two structural units of the formula:

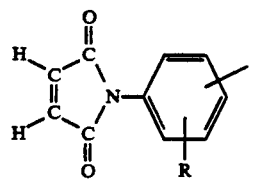

wherein R stands for hydrogen, halogen, alkyl or alkoxy. The maleimide resin may be produced by a conventional method such as a method including the steps of reacting a maleic anhydride compound with a polyamino compound to form a carboxyl group-containing maleamide compound, and subjecting the carboxyl group-containing maleamide compound to dehydrative cyclization. Illustrative of suitable polyamino compounds are phenylenediamine, xylylenediamine, 4,4'-diaminodiphenyl, bis(4-aminophenyl)methane, bis(4-aminophenyl)ether, bis(4-amino-3-methylphenyl)methane, 2,2-bis(4-aminophenyl)propane, 2,2-bis(4-amino-3-methylphenyl)propane, 2,2-bis(4-amino-3-chlorophenyl)propane and 1,1-bis(4-aminophenyl)-1-phenylethane. The maleimide resin may be commercially available, for example, as MP-2000X and MB-3000 (both products of Mitsubishi Yuka K. K.) and SM-20 and AL-90 (both products of Sumitomo Chemical Industry, Ltd.).

The maleimide resin should be used in an amount of 3-50 parts by weight, preferably 5-20 parts by weight per 100 parts by weight of the epoxy resin. Too large an amount of the maleimide resin in excess of 50 parts by weight is disadvantageous because the penetrability of the resultant composition becomes poor and the cured resin becomes low in cracking resistance. On the other hand, an amount of the maleimide resin below 3 parts by weight tends to reduce the heat resistance of the cured resin.

Wollastonite to be used in the present invention has a chemical formula of CaSiO$_3$ and is in the form of fibrous or columnar crystals. The wollastonite preferably has an average particle size of 0.5-100 μm, more preferably 2-25 μm.

The wollastonite should be used in an amount of 50-400 parts by weight, preferably 100-300 parts by weight per 100 parts by weight of the epoxy resin. When the wollastonite is used in excess of 400 parts by weight, the penetrability of the composition becomes poor. On the other hand, when the amount of the wollastonite is smaller than 50 parts by weight, the cracking tendency of the cured resin becomes undesirably increased.

The thermosetting resin composition of the present invention may further contain one or more additives such as a flame retarder, a coupling agent, a lubricating agent, slump-preventing agent, a leveling agent, a thixotropic agent, a sedimentation-preventing agent, a dispersing agent, a wetting agent, a dye, a pigment, an adhesion-improver, an anti-foaming agent and a plasticizer as desired.

During storage and transportation, the composition according to the present invention is preferably rendered in the form of a two-component pack type composition consisting of a first component pack including the liquid epoxy resin, the maleimide resin and wollastonite and a second component pack including the acid anhydride curing agent. In use, the two packs are mixed and the mixture is applied to an article to be processed.

Figure 2:
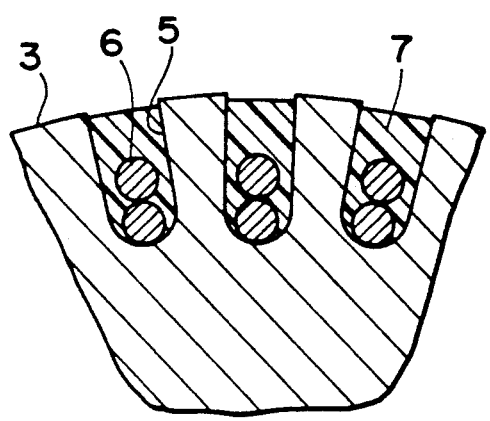
FIG. 2 is a partial, sectional view of the rotor of FIG. 1.

The thermosetting resin composition according to the present invention is suitably used for insulating windings of a rotor or stator of a motor. FIG. 1 depicts one example of a rotor. Designated generally as 1 is a rotor which includes an armature core 3 composed of a plurality of stacked plates secured to a rotary shaft 2 and a commutator 4 fixed to the shaft 2. The armature core has a plurality of axially extending slots 5 on its periphery within each of which windings 6 are disposed. The windings 6 are electrically connected to the commutator 4. Designated as 7 is an insulating layer provided for insulating the windings 6 as well as for fixing the windings 6 within the slots 5 (see FIG. 2).

Figure 3A:
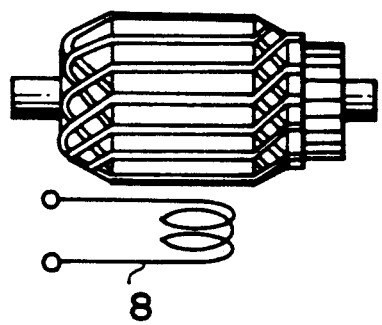
FIGS. 3(a) through 3(c) are diagrammatical illustration of a method of insulating windings of a rotor.

The insulating layer 7 may be formed in various manners. Referring to FIGS., 3(a) through 3(b), a previously assembled rotor is preheated with a heater 8 to 150°-200° C. (FIG. 3(a)) and the thermosetting resin composition 7 is applied dropwise from nozzles 9 to the heated rotor 1, preferably while rotating the rotor about the shaft 2 (FIG. 3(b)) at a revolution speed of about 40 rpm. As soon as the composition 7 is applied to the preheated rotor 1, the viscosity of the composition 7 is lowered so that the composition 7 can smoothly penetrate through the slots. The composition 7 then begins curing.

Figure 4:
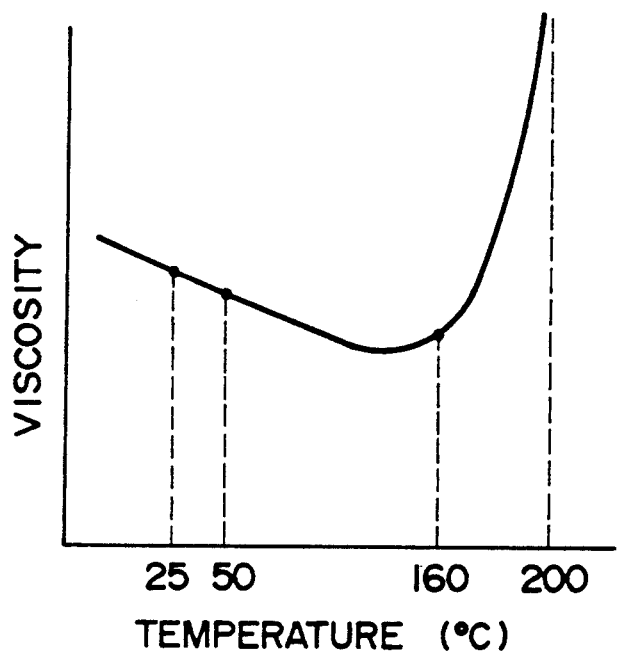
FIG. 4 is a graph showing a relationship between temperature and viscosity of a thermosetting resin composition according to the present invention.

FIG. 4 illustrates relationship between temperature and viscosity of a typical thermosetting resin composition of the present invention. At a temperature of 25° C., the viscosity is about 550 cP. The viscosity decreases as the temperature is raised and become 10 cP at about 160° C. Thereafter, the viscosity abruptly and quickly increases due to gellation of the composition. In order to permit the applied composition 7 to penetrate into the slots and to be cured within a short period of time, the pre-heating of the rotor with the heater 8 preferably performed at 160°-180° C.

Figure 3B:
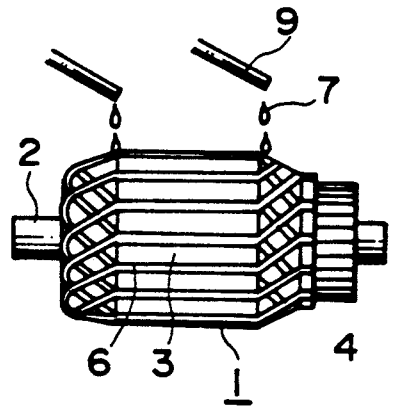
Figure 3C:
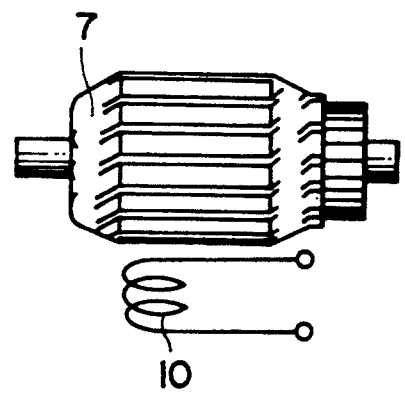
Figure 5:
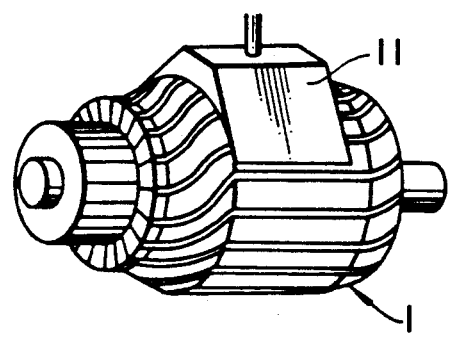
FIGS. 5 through 7 are explanatory views of a method of applying a resin composition to windings of a rotor according to the present invention.
Figure 6:
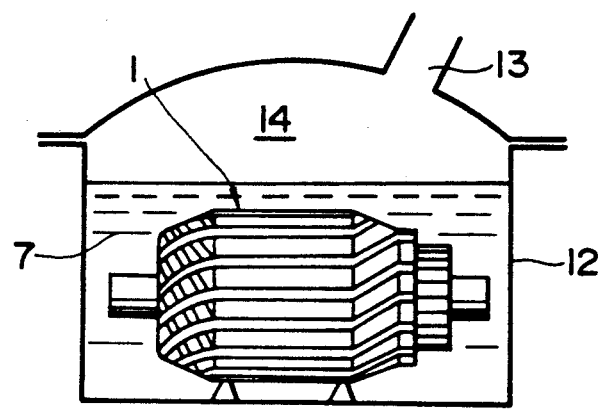
Figure 7:
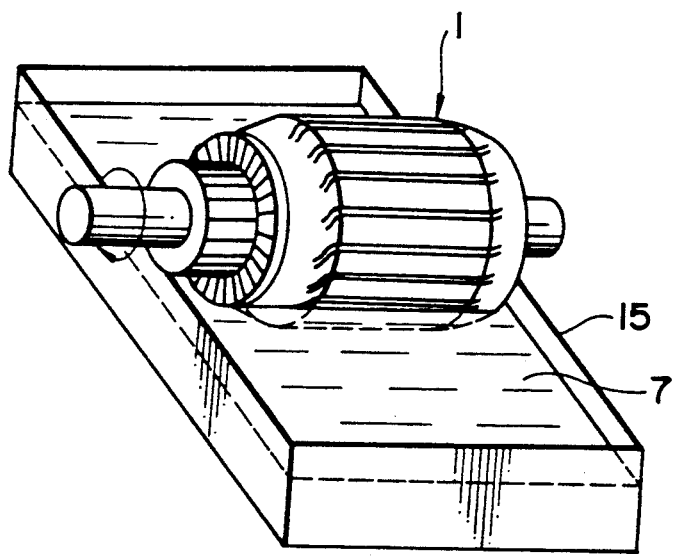

FIGS. 5 through 7 illustrate alternative embodiments for the applying step of FIG. 3(b). In FIG. 5, the resin composition is charged in a compressive applicator 11 fitted on the preheated rotor 1 and is ejected therefrom under a pressure of 1-3 kg/cm$^2$ to forcibly introduce the composition into the slots. By this, the penetration of the resin is accelerated.

In the embodiment of FIG. 6, the preheated rotor 1 is immersed in a bath of the thermosetting resin composition 7 stored in a tank 12. The inside space 14 of the tank 12 is then evacuated to remove air within the slots through a port 13 so that the resin composition 7 can easily penetrate into the slots.

In the embodiment of FIG. 7, the preheated rotor is dipped, while being rotated, in a bath of the thermosetting resin composition 7 stored in a tray 15.

The rotor 1 which has been applied with the resin composition is then heated at a temperature of 160°-200° C. for about 5-6 minutes to complete the curing of the resin composition ad to form insulating coatings or layers within the slots and both sides of the armature core as shown in FIG. 1.

The rotor whose windings have thus been insulated and fixed in position exhibits excellent thermal resistance. In particular, even when the rotor is operated under severe conditions (at about 5000 rpm and 350° C. for 10 minutes), the insulation layer is free of cracks or deformation and the windings are still firmly bonded with and electrically insulated by the insulation layer.

The following examples will further illustrate the present invention, in which "part" is by weight.

PREPARATION EXAMPLES

Example 1

A thermosetting resin composition having the following formulations were prepared:

| | |
|---|---|
| Epoxy resin | 100 parts |
| (a mixture of 60 parts of glycidyl ether of Bisphenol A *1 and 40 parts of 3,4-Epoxycyclohexylmethyl 3,4-epoxycyclohexanecarboxylate *2) | |
| Maleimide resin*3 | 10 parts |
| Methylhexahydrophthalic anhydride*4 | 91 parts |
| 1-Benzyl-2-methylimidazole*5 | 1 part |
| Wollastonite*6 | 50 parts |

*1: EPIKOTE 828, manufactured by Yuka-Shell Epoxy Inc., number average molecular weight 380
*2: CEROXIDE 2021, manufactured by Dicel Kagaku Kogyo K. K.
*3: MP2000X, manufactured by Mitsubishi Yuka K. K.
*4: Curing agent Me-HHPA, manufactured by Shinnihon Rica K.K.
*5: Curing accelerator IB2MZ, manufactured by Shikoku Kasei Inc.
*6: Average particle size: 10 μm

Example 2

A thermosetting composition was prepared in the same manner as that of Example 1 except that the amount of the wollastonite was increased to 200 parts.

Example 3

A thermosetting composition was prepared in the same manner as that of Example 1 except that the amount of the wollastonite was increased to 300 parts.

Example 4

A thermosetting composition was prepared in the same manner as that of Example 2 except that the amount of the maleimide resin was increased to 20 parts.

Example 5

A thermosetting composition was prepared in the same manner as that of Example 1 except that the amount of the wollastonite was increased to 100 parts and that 92 parts of methyltetrahydrophthalic anhydride (curing agent Me-THPA, manufactured by Dainihon Ink Chemical Industry Ltd.) were used in place of the 91 parts of methylhexahydrophthalic anhydride.

Example 6

A thermosetting composition was prepared in the same manner as that of Example 2 except that the amounts of the maleimide resin and the acid anhydride were increased to 40 parts and 98 parts, respectively and that a mixture of 30 parts of a glycidyl ether of Bisphenol F (EPIKOTE 807, manufactured by Yuka-Shell Epoxy Inc., number average molecular weight: 330) and 70 parts of CEROXIDE 2021 (vide supra) was used as the epoxy resin.

Comparative Example 1

A thermosetting composition was prepared in the same manner as that of Example 2 except that no maleimide resin was used.

Comparative Example 2

A thermosetting composition was prepared in the same manner as that of Example 4 except that no wollastonite was used.

Comparative Example 3

A thermosetting composition was prepared in the same manner as that of Example 4 except that the amount of the wollastonite was increased to 500 parts.

Comparative Example 4

A thermosetting composition was prepared in the same manner as that of Example 1 except that the amount of the maleimide resin was increased to 60 parts.

Example 7

A two components-pack type thermosetting resin composition was prepared as follows.

| | |
|---|---|
| First Component: | |
| Epoxy resin | 100 parts |
| (a mixture of 60 parts of glycidyl ether of Bisphenol A and 40 parts of 3,4-Epoxycyclohexylmethyl 3,4-epoxycyclohexanecarboxylate) | |
| Maleimide resin | 10 parts |
| 1-Benzyl-2-methylimidazole | 1 part |
| Wollastonite | 50 parts |
| Second Component: | |
| Methylhexahydrophthalic anhydride | |

The two components were blended with a blending ratio of the first component to the second component of 161:100 to provide a thermosetting resin composition suitable for slot insulation purposes.

Performance Test

The thermosetting resin compositions obtained in Examples 1-6 and Comparative Examples 1-4 were subjected to various tests for evaluating their performance. The test methods are as follows:

Penetrability Test

A copper wire (diameter: 2 mm) is wound around a core to obtain a rotor coil having five-layered windings. The coil is heated to 160° C., onto which is applied dropwise the epoxy resin composition to be tested while slowly rotating the coil. The coil impregnated with the epoxy resin composition is maintained at 160° C. to cure the composition. After cooling, the coil is cut along a plane crossing the winding direction and the cut surfaces are observed to evaluate the condition of impregnation of the resin. The evaluation is rated as follows:

A: All of the five-layered windings are impregnated with the resin
B: Windings of up to the third or fourth layer (from the outermost) are impregnated with the resin
C: Windings of only the first outermost layer or up to the second layer are impregnated with the resin Resistance to Temperature Variation Test A rotor coil whose windings are insulated by cured resin is prepared in the same manner as that in the above Penetrability Test. The rotor coil is cooled to −40° C. and maintained at that temperature for 30 minutes. Subsequently the coil is heated to 155° C. and maintained at that temperature for 30 minutes. Such an alternate cooling and heating treatment is repeated 10 times. Thereafter, the coil is cut to observe boundaries between the resin layer and the windings with a magnifying glass to check whether there are formed cracks in the resin layer and whether separation of the resin layer from the windings is occurred. The evaluation is made as follows:
A: Neither crack nor separation is observed
B: Crack or separation is observed Thermal Resistance Test A rotor coil whose windings are insulated by cured resin is prepared in the same manner as that in the above Penetrability Test. The rotor coil is heated to 400° C. and maintained at that temperature for 30 minutes. After cooling to room temperature, the coil is cut to observe boundaries between the resin layer and the windings with a magnifying glass to check whether there are formed cracks in the resin layer and whether separation of the resin layer from the windings is occurred. The evaluation is made as follows:
A: Neither crack nor separation is observed
B: Crack or separation is observed The test results are summarized in Table 1 together with the compositions of the insulating resins.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A thermosetting resin composition comprising:
   a bisphenol-epichlorohydrin epoxy resin which is liquid at room temperature;
   a liquid hydroaromatic acid anhydride curing agent present in the amount of 0.7–1.3 mole per equivalent of epoxy groups in said epoxy resin;
   an imidazole curing accelerator;
   a bismaleimide resin in an amount of 3–50 parts by weight per 100 parts by weight of said epoxy resin; and
   finely divided wollastonite in an amount of 50–400 parts by weight per 100 parts by weight of said epoxy resin, said wollastonite having a particle size of 2–25 microns.

2. A composition according to claim 1, wherein the bis-maleimide resin and the wollastonite are used in amounts of 5–20 parts by weight and 100–300 parts by weight, respectively, per 100 parts by weight of said epoxy resin.

3. A composition according to claim 1, wherein the maleimide resin is a resin having two structural units of the formula:

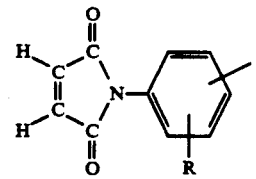

wherein R stands for hydrogen, halogen, alkyl or alkoxy.

4. A composition in accordance with claim 1 further comprising a solid acid anhydride curing agent dissolved in said composition.

5. A composition in accordance with claim 1 wherein said wollastonite is in the form of fibrous or columnar crystals.

6. A composition in accordance with claim 1 further comprising an additional epoxy resin.

7. A two component pack, consisting of a first component pack which comprises (1) a bisphenol-epichlorohydrin epoxy resin which is liquid at room temperature, (2) a bismaleimide resin in an amount of 3–50 parts by weight per 100 parts by weight of said epoxy resin, and (3) finely divided wollastonite in an amount of 50–400 parts by weight per 100 parts by weight of said epoxy resin, said wollastonite having a particle size

|  | Example No. |  |  |  |  |  | Comparative Example No. |  |  |  |
|---|---|---|---|---|---|---|---|---|---|---|
|  | 1 | 2 | 3 | 4 | 5 | 6 | 1 | 2 | 3 | 4 |
| Ingredient |  |  |  |  |  |  |  |  |  |  |
| EPIKOTE 828 | 60 | 60 | 60 | 60 | 60 |  | 60 | 60 | 60 |  |
| EPIKOTE 807 |  |  |  |  |  | 30 |  |  |  | 30 |
| CEROXIDE 2021 | 40 | 40 | 40 | 40 | 40 | 70 | 40 | 40 | 40 | 70 |
| Maleimide resin | 10 | 10 | 10 | 20 | 10 | 40 | — | 20 | 20 | 60 |
| Me-HHPA | 91 | 91 | 91 | 91 |  | 98 | 91 | 91 | 91 | 98 |
| Me-THPA |  |  |  |  | 92 |  |  |  |  |  |
| Accelerator | 1 | 1 | 1 | 1 | 1 | 1 | 1 | 1 | 1 | 1 |
| Wollastonite | 50 | 200 | 300 | 200 | 100 | 200 | 200 | — | 500 | 200 |
| Test results |  |  |  |  |  |  |  |  |  |  |
| Penetrability | A | A | A | A | A | A | A | A | C | C |
| Temperature Variation | A | A | A | A | A | A | A | B | * | * |
| Thermal Resistance | A | A | A | A | A | A | A | B | * | * |

*Test was not conducted because of poor penetrability.

of 2-25 microns; and a second component pack which comprises (1) a liquid hydroaromatic acid anhydride curing agent present in the amount of 0.7-1.3 mole per equivalent of epoxy groups in said epoxy resin; and (2) an imidazole curing accelerator, said first and second component packs providing a thermosetting resin composition when mixed with each other.

8. A two component pack in accordance with claim 7 further comprising a solid acid anhydride curing agent in said second component pack.

9. A two component pack in accordance with claim 7 wherein said wollastonite is in the form of fibrous or columnar crystals.

10. A two component pack in accordance with claim 7 wherein said first component pack further includes an additional epoxy resin.

* * * * *